United States Patent
Chen et al.

(10) Patent No.: US 8,014,610 B2
(45) Date of Patent: Sep. 6, 2011

(54) METHOD OF MULTI-PATH BLOCK MATCHING COMPUTING

(75) Inventors: Chao-Ho Chen, Tai-Nan (TW); Yi-Fan Li, Taipei (TW)

(73) Assignee: Huper Laboratories Co., Ltd., Jong-Shan District, Taipei (TW)

( * ) Notice: Subject to any disclaimer, the term of this patent is extended or adjusted under 35 U.S.C. 154(b) by 905 days.

(21) Appl. No.: 11/467,925

(22) Filed: Aug. 29, 2006

(65) Prior Publication Data

US 2007/0196018 A1  Aug. 23, 2007

Related U.S. Application Data

(60) Provisional application No. 60/766,975, filed on Feb. 22, 2006.

(51) Int. Cl.
*G06K 9/00* (2006.01)

(52) U.S. Cl. ........ 382/209; 382/192; 382/199; 382/219; 375/240.16

(58) Field of Classification Search .............. 382/209
See application file for complete search history.

(56) References Cited

U.S. PATENT DOCUMENTS

| | | | | |
|---|---|---|---|---|
| 6,058,212 | A * | 5/2000 | Yokoyama | 382/236 |
| 7,627,140 | B2 * | 12/2009 | Chen | 382/107 |
| 2001/0024473 | A1 * | 9/2001 | Nakaya et al. | 375/240.16 |
| 2002/0051572 | A1 * | 5/2002 | Matsumoto et al. | 382/190 |
| 2002/0064229 | A1 * | 5/2002 | Nakaya | 375/240.17 |
| 2004/0258154 | A1 * | 12/2004 | Liu et al. | 375/240.16 |
| 2005/0025244 | A1 * | 2/2005 | Lee et al. | 375/240.16 |
| 2005/0232361 | A1 * | 10/2005 | Nakaya et al. | 375/240.17 |
| 2006/0268982 | A1 * | 11/2006 | Lee et al. | 375/240.03 |

OTHER PUBLICATIONS

Hamosfakidis et al., Feb. 5, 2002, EURASIP Journal on Applied Signal Processing, pp. 595-600.*
Zhu et al., "A Novel Hexagon-Based Search Algorithm for Fast Block Motion Estimation," 2001, IEEE, vol. 3, pp. 1593-1596.*
Chen et al., "A Novel Flatted Hexagon Search Pattern for Fast Block Motion Estimation," Oct. 24-27, 2004, IEEE, vol. 3, pp. 1477-1480.*
Zhu et al., "A Novel Hexagon-Based Search Algorithm for Fast Block Motion Estimation," 2001, IEEE, vol. 3, pp. 1593-1596.*
Chen et al., "A Novel Flatted Hexagon Search Pattern for Fast Block Motion Estimation," Oct. 24-27, 2004, IEEE, vol. 3, pp. 1477-1480.*
Zhu et al., "A Novel Hexagon-Based Search Algorithm for Fast Block Motion Estimation," 2001, IEEE, vol. 3, pp. 1593-1596.*
Chen et al., "A Novel Flatted Hexagon Search Pattern for Fast Block Motion Estimation," Oct. 24-27, 2004, IEEE, vol. 3, pp. 1477-1480.*

* cited by examiner

*Primary Examiner* — John Lee
(74) *Attorney, Agent, or Firm* — Winston Hsu; Scott Margo (57) ABSTRACT

Disclosed is a multi-path method of block matching computing for image processing, which comprises: determining a searching pattern with a center pixel point and a plurality of surrounding pixel points to perform a block searching operation; computing a plurality of pixel value differences between the center pixel point and the surrounding points of two continuous frames; and utilizing at least two pixel points with a pixel value difference as the center pixel point to perform the next block searching operation, wherein the pixel difference of the at least two pixel points has a difference less than a predetermined value from a minimum pixel value difference.

11 Claims, 7 Drawing Sheets

METHOD OF MULTI-PATH BLOCK MATCHING COMPUTING

CROSS REFERENCE TO RELATED APPLICATIONS

This application claims the benefit of the filing date of U.S. provisional patent application No. 60/766,975, filed Feb. 22, 2006, the contents of which are hereby incorporated by reference.

BACKGROUND OF THE INVENTION

1. Field of the Invention

The present invention relates to a method of block matching computing for image processing, and particularly relates to a method of multi-path block matching computing for image processing and a method of block matching computing utilizing a flat pattern.

2. Description of the Prior Art

Motion estimation utilizing a block matching processing is usually applied to many video encoding technique standards, such as ITU-T, H. 261, H. 263, ISO MPEG-1, MPEG-2 and MPEG-4. Such video encoding techniques are used for solving repetition of continuous frames in the time domain. Compared with the compression technique for a single frame (i.e. JPEG), such video encoding techniques include higher compression efficiency. Besides video compression, motion estimation can further be used for motion tracing, video noise filtering and object separating of a non-fixed camera. Motion estimation requires a lot of computing, however, so various kinds of high-speed block matching methods are developed, which are used for substantially decreasing the complexity of calculation under the condition of tolerant error. The methods for decreasing computing complexity can be divided into two categories. A first category decreases the searching points in a searching pattern to approach the best solution gradually. Such a kind of method includes decreasing the pixel number of block sampling or utilizing matching rules with low complexity. Some examples of high-speed block matching methods and methods for decreasing the number of block sampling are described below.

Most high-speed block matching methods utilize a searching pattern and range to determine the searching process. For continuous images of real world, motion vectors of most objects are non-existent or slight, and a few are fast. Thus, the motion vector always has the distribution characteristic of center-bias, which is used for a 3-step-searching method, and a 4-step-searching method and gradient searching method are used for improving the efficiency of the 3-step-searching method. The searching patterns of the above-mentioned methods are based on a square shape. Furthermore, the diamond searching method utilizes searching patterns with closer and fewer searching points. In this way, the diamond searching method not only increases the searching speed, but also decreases the probability of limiting the local optimum solution.

A hexagon searching method utilizes a hexagon searching pattern with seven checking points, and further adds 3 checking points for each searching step. For frames with high DPI (dots per inch), the hexagon searching method is not as accurate as the diamond searching method, and although it has a higher speed, it has a poor accuracy for video with low DPI. A cross diamond searching method utilizes a cross searching pattern at first, and then utilizes halfway-stop technique and diamond searching patterns, thus it can achieve a faster speed than the diamond searching method while maintaining a searching quality that is similar to the diamond searching method. It utilizes different searching patterns and processing steps, however, thus involving higher cost and complexity.

Additionally, since scientific apparatus and semiconductors are rapidly improving, utilizing improved PC clocks can also increase the operation speed. The expansion of CPU media commands is advantageous for vision calculation, thus digital image processing and video compression are widely applied to PCs. Therefore, a digital video recorder includes several advantages such as: no distortion during repeated recording, ease of data backup, quick searching ability for data history and convenience of looking up. Multi monitoring at the same time is always a necessary demand for modern monitoring systems, but this function will cause heavy loading to the system. Also, the CPU will have a heavier loading if other functions such as noise filtering, invasion detecting, motion tracing, moving object identification and calculation, terrorist and behavior analyzing, fire detection, and watermarking encryption are required. Therefore, since it is desirable to have more sources for executing more vision functions, operation speed becomes an important factor for the monitoring system. Moreover, video compression will be widely applied in mobile phone systems in the future, and motion estimation occupies the greatest calculation power of the whole system. Therefore, low power calculation is necessary for modern high-speed motion estimation, but a single high-speed motion estimation method is not sufficient for real time multi recording of DVR, or real time application of other video compression methods. Accordingly, a faster block matching calculation method that can be applied with the method for sampling part of the pixels in the block is more suitable for a system that requires real time video processing. It should be noted that, since the high-speed block matching calculation method and the method for sampling part of pixels in the block cause distortion, such a combination may cause more distortion, which decreases the compression rate of the DVR system. Furthermore, there will be more demand for more channels, thus a new motion estimation technique with higher speed and low distortion is needed.

The following description summarily discloses the prior art 3 step searching method, diamond searching method, cross diamond searching method and the advantages and disadvantages of said methods.

Step 1 of the 3 step searching method computes a center point and a further 9 points that are 4 units away from the center point. Step 2 utilizes the point with a minimum pixel difference value from step 1 as the center point, computes points 2 units away from the center, and compares these pixel points to obtain a pixel point having a minimum pixel value difference. Step 3 utilizes the point having a minimum pixel difference value from step 2 as the center point, computes points 1 unit away from the center, and calculates nine points including the center to determine the point having a minimum pixel difference.

Such kind of method includes nine points and performs a searching operation from large range to small range. The correct motion vector will not be found, however, if the large range searching cannot find the correct direction at first. Since the 3 step searching method generally determines the location of the motion vector in step 1, the above-mentioned situation often happens, resulting in a non-accurate motion vector, but the 3 step searching method has the advantage of stable calculation.

The diamond searching method also includes 3 steps as described below: Step 1: Check and compute nine pixel points based on the center point of the searching range and determine if the point having a minimum pixel value difference is the center point. If yes, jump to step 3, otherwise continue with step 2. Step 2: Check and compute the pixels of the nine points of the diamond searching pattern based on the pixel having minimum block distortion from step 1 and determine if the point having a minimum pixel value difference is the center point. If yes, jump to step 3, otherwise repeat step 2. Step 3: Mark five diamond searching points based on the center point of the searching range and obtain the motion vector according to the point having minimum block distortion.

The diamond searching method utilizes non-rectangular searching, which includes the characteristic of centralizing searching close to the motion vector. Also, the diamond searching method utilizes a searching pattern with fewer searching points for a final check, and has a faster searching speed. Moreover, such kind of searching method utilizes repeated searching points to prevent the searched motion vector from being trapped into the local region. Since the method includes repeated searching points, it utilizes more overhead, however.

The cross diamond searching method includes the following steps: Step 1: Utilize the center point of the searching pattern as the start point and a cross pattern as the searching pattern to calculate nine pixels and determine if the point having a minimum pixel value difference is at the center of the searching pattern. If yes, the original point is the desired motion vector. If not, jump to step 2. Step 2: Increase two check points at the searching direction for minimum distortion value of step 1. If the location of the point with minimum distortion value is still at the center of the two new points, the co-ordinate is the motion vector. If not, jump to step 3. Step 3: Perform the diamond searching method by utilizing the point having a minimum pixel value from step 2 as the center point. The following steps are the same as the diamond searching method.

Practical video data includes a high probability in both horizontal and vertical directions. Thus, the cross diamond searching method is a diamond-searching-method-based calculation method of computing the cross pattern center point by utilizing such characteristics and the half-stop technique. It improves the accuracy and the speed while the motion vector is near the center. This method includes the most-complicated algorithm, however, and is hard to be realized. Furthermore, this method is slower than the diamond searching method and decreases the effect of said method while the motion vector occurs in areas not including the cross pattern As described above, the prior searching method includes at least one of the following disadvantages: low speed, complicated computing, and low accuracy. Additionally, the above mentioned searching method only performs a searching operation based on pixels having a minimum pixel difference, however, the points excepting the point having a minimum pixel difference may also lie in the correct searching direction, thus the error probability for pattern searching is increased. Furthermore, the prior art searching method always suffers the problem of hollowing, that is, there is a high ratio of hollow pixels in the searching patterns, thus the accuracy is affected and the overhead is wasted.

Thus, a new searching method is needed to solve those problems mentioned above.

SUMMARY OF THE INVENTION

Therefore, one objective of the present invention is to provide a multi-path block matching computing method, which utilizes an adjustable method of block matching computing to provide a multi-path searching method for decreasing the error probability and increasing the flexibility of pattern searching.

Another objective of the present invention is to provide a multi-path method of block matching computing utilizing a flat searching pattern while performing frame searching for the images with lower DPI.

The disclosed invention describes a multi-path method of block matching computing for image processing, comprising: determining a searching pattern with a center pixel point and a plurality of surrounding pixel points to perform a block searching operation; computing a plurality of pixel value differences between the center pixel point and the surrounding points of two continuous frames; and utilizing at least two pixel points with a pixel value difference as the center pixel point to perform the next block searching operation, wherein the pixel difference of the at least two pixel points has a difference less than a predetermined value from a minimum pixel value difference.

The disclosed invention further discloses: a method of block matching computing for image processing, comprising: determining a searching pattern with a center pixel point and a plurality of surrounding pixel points, wherein the searching pattern includes a larger searching area in the horizontal direction than a searching area in the vertical direction; and utilizing the searching pattern to perform a block searching operation.

The disclosed invention also discloses: a method of block matching computing for image processing, comprising: determining a searching pattern with a center pixel point and a plurality of surrounding pixel points, wherein the searching pattern includes a larger searching area in the horizontal direction than a searching area in the vertical direction; computing a plurality of pixel value differences between the center pixel point and the surrounding points of two continuous frames; and utilizing at least two pixel points with a pixel value difference having a difference less than a predetermined value from the minimum pixel value difference as the center pixel point to perform the next block searching operation.

According to the above-mentioned block matching computing method, the error probability and the hollowing effect can be decreased, and the efficiency of searching can be increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
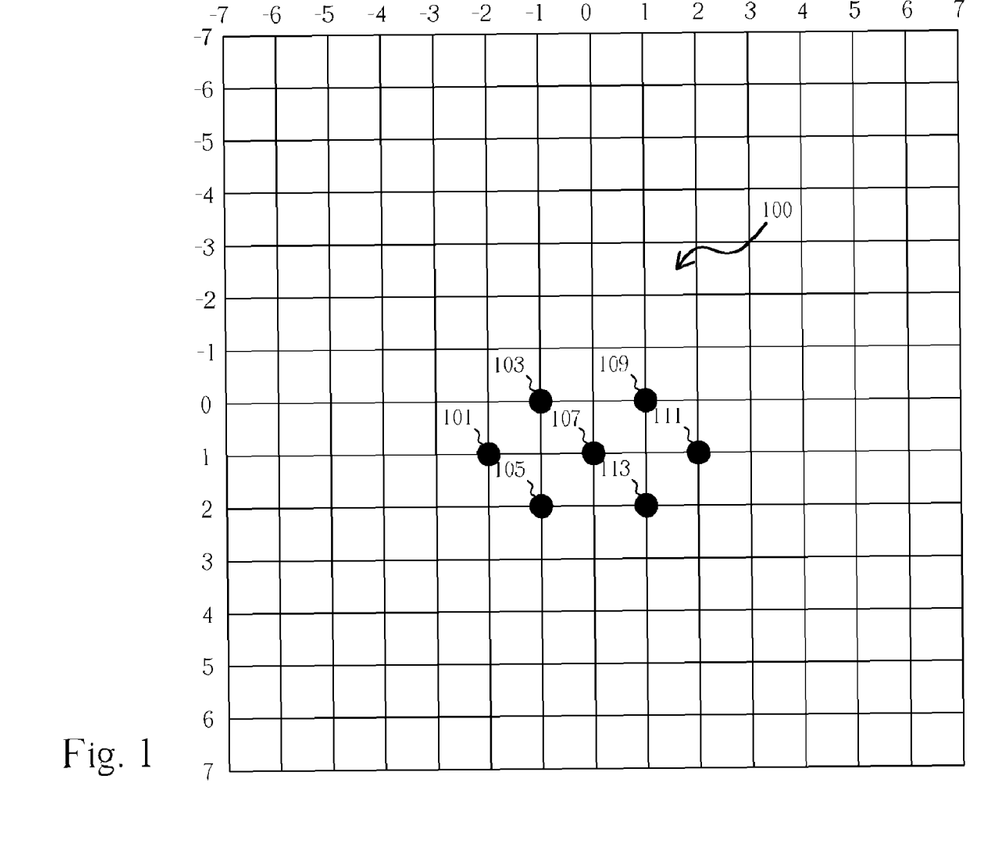
FIG. 1 is a schematic diagram illustrating a method of flat hexagon pattern block matching computing according to a preferred embodiment of the present invention.
Figure 2:
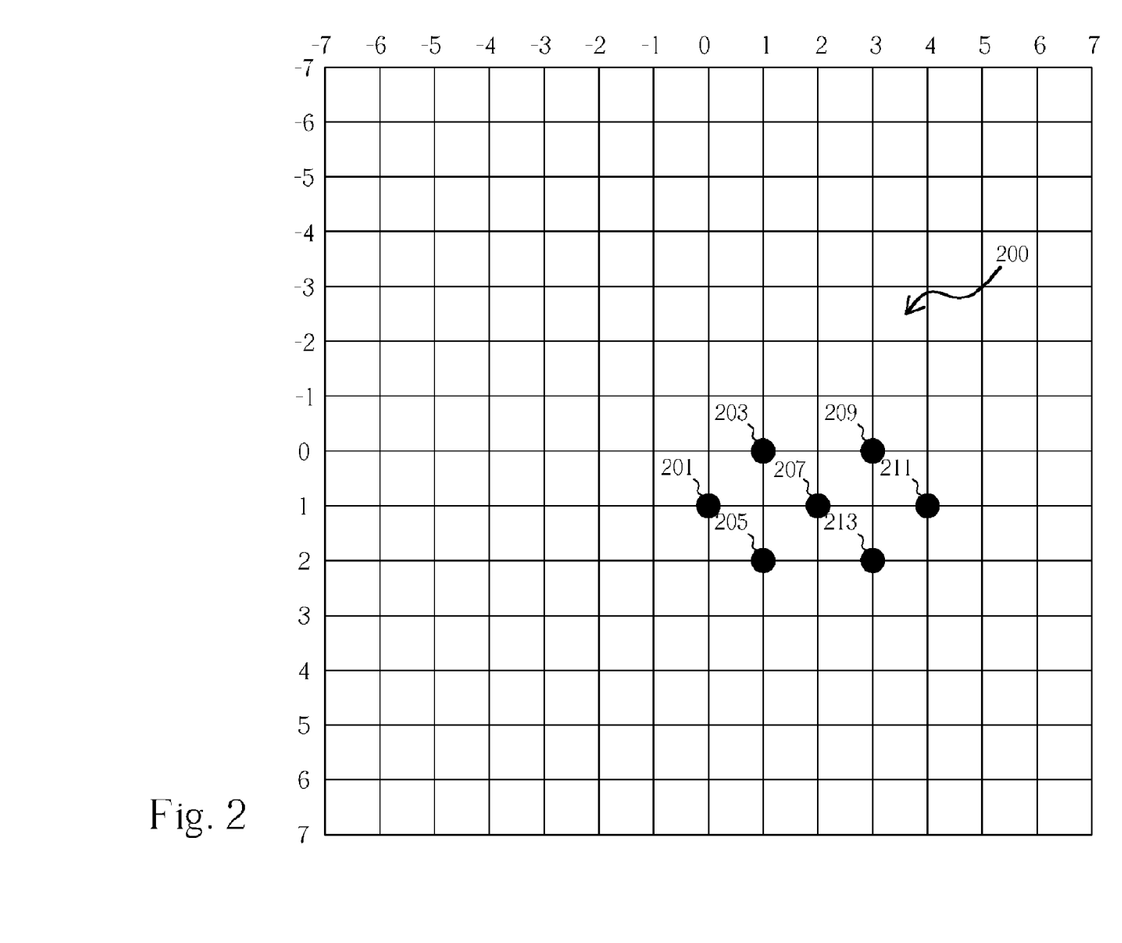
FIG. 2 is a schematic diagram illustrating the method of flat hexagon pattern block matching computing according to the preferred embodiment of the present invention.

FIGS. 1-4 are schematic diagrams illustrating the flat hexagon pattern method of block matching computing according to the preferred embodiment of the present invention, wherein the horizontal axis and vertical axis represent the vector direction in FIGS. 1-4. Please refer to these figures together to understand the present invention more clearly, As shown in FIG. 1, the method of flat hexagon pattern block matching computing according to the present invention first determines a searching pattern 100 with pixel points 101~113, wherein the pixel point 107 is the center pixel point of the searching pattern 100, and the pixel points 101, 103, 105, 109, 111 and 113 are the surrounding pixel points. Next, the pixel point having a minimum pixel value difference among the surrounding points is regarded as a center point and the same searching pattern is used for the searching operation, as shown in FIG. 2.

In FIG. 2, the pixel point 111 has been assumed to be the pixel point having a minimum pixel value difference and is used as the center pixel point 207 shown in FIG. 2. After that, a searching operation utilizing the searching pattern shown in FIG. 1 is performed taking the center pixel point determined in FIG. 1. Besides the center pixel point, the searching pattern shown in FIG. 2 further includes surrounding pixel points 201, 203, 205, 209, 211 and 213. Afterwards, the method will perform other operations, or finish if the center pixel point is found to be the point having a minimum pixel value difference. This is further described below. Otherwise, the same operations are performed to form the diagram shown in FIG. 3, that is, the pixel point having a minimum pixel value difference among the surrounding pixel points is utilized to perform searching operations.

Figure 3:
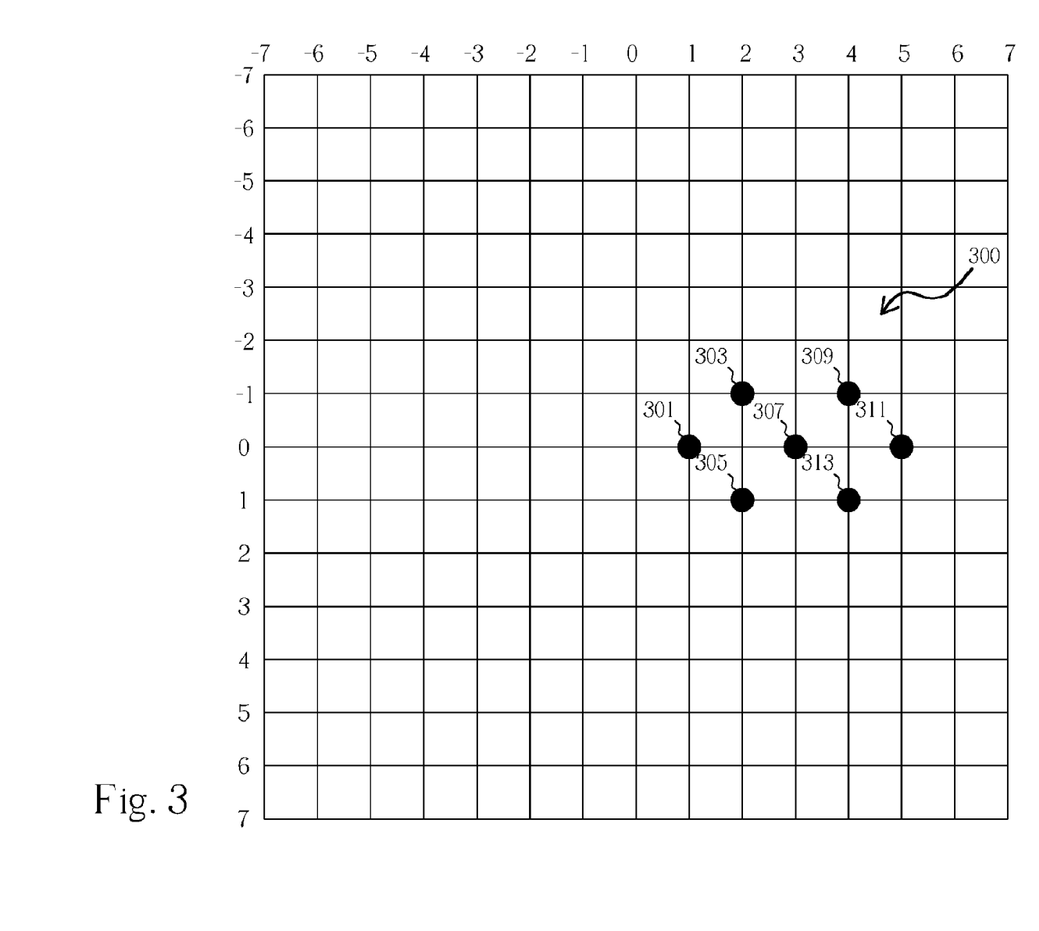
FIG. 3 is a schematic diagram illustrating the method of flat hexagon pattern block matching computing according to the preferred embodiment of the present invention.

In FIG. 3, the surrounding pixel point 209 has been assumed to be the pixel point having a minimum pixel value difference and is used as the center pixel point 307 shown in FIG. 3. Also, the surrounding points corresponding to the center pixel point 307 are 301, 303, 305, 309, 311 and 313. Similarly, the disclosed method will perform other operations, or finish if the center pixel point is found to be the point having a minimum pixel value difference. This is further described below. Otherwise, the same operations are performed, that is, the pixel point having a minimum pixel value difference among the surrounding pixel points is utilized to perform searching operations. In this case, the center pixel point 307 has a minimum pixel value difference, thus the operation shown in FIG. 4 is performed.

Figure 4:
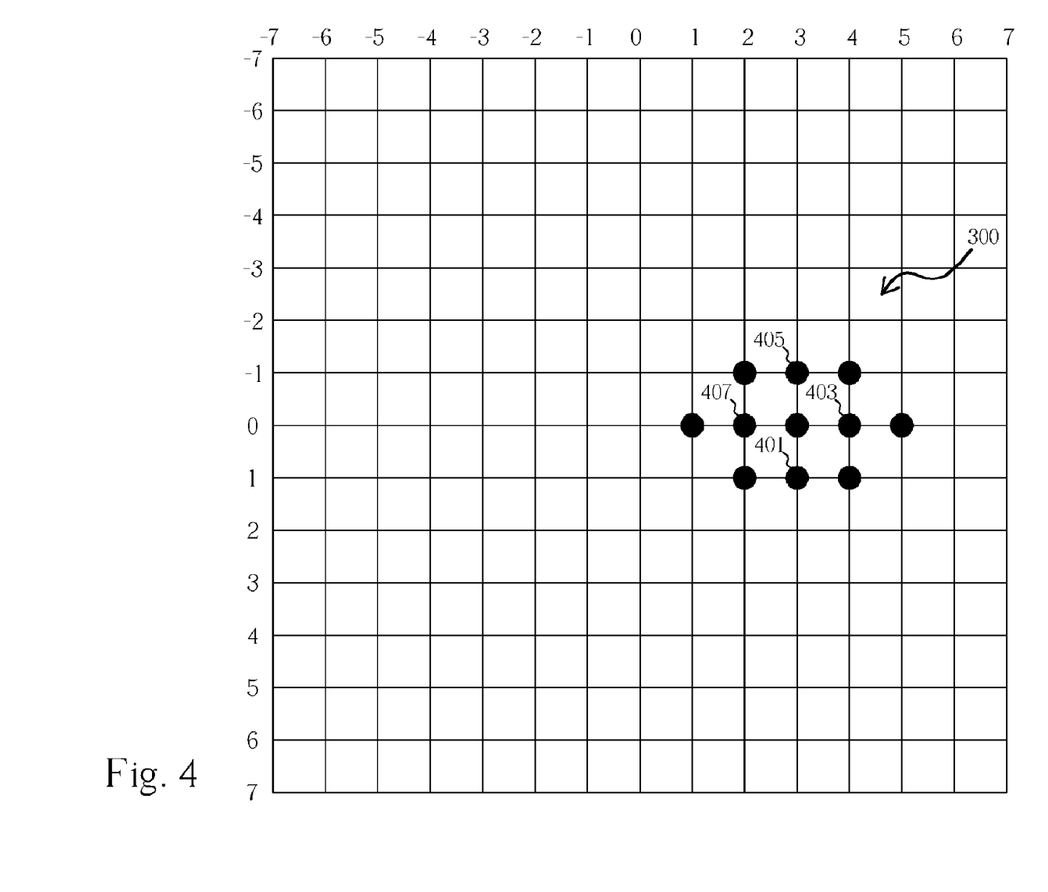
FIG. 4 is a schematic diagram illustrating the method of flat hexagon pattern block matching computing according to the preferred embodiment of the present invention.

As shown in FIG. 4, the pixel point 307 is utilized as the center pixel point to perform a cross searching method for computing the un-computed part of the searching pattern 300 shown in FIG. 3 such as pixel points 401, 403, 405 and 407, and the pixel point having the minimum pixel value difference is utilized as a motion vector. In the above-mentioned steps, the pixel value difference is determined according to the SAD (sum of absolute differences) value, but this is not meant to limit the scope of the present invention.

Since the frequency of the horizontal motion of an image is higher than that of the vertical motion, utilizing a flat pattern can substantially increase the searching efficiency. It should be noted that the above-mentioned flat hexagon searching pattern is only used as an example and is not meant to limit the scope of the present invention. All flat searching patterns with a horizontal searching area larger than a vertical searching area should be included in the scope of the present invention. Also, the searching method for computing the un-computed part of the searching pattern can be changed according to different searching patterns.

Figure 5:
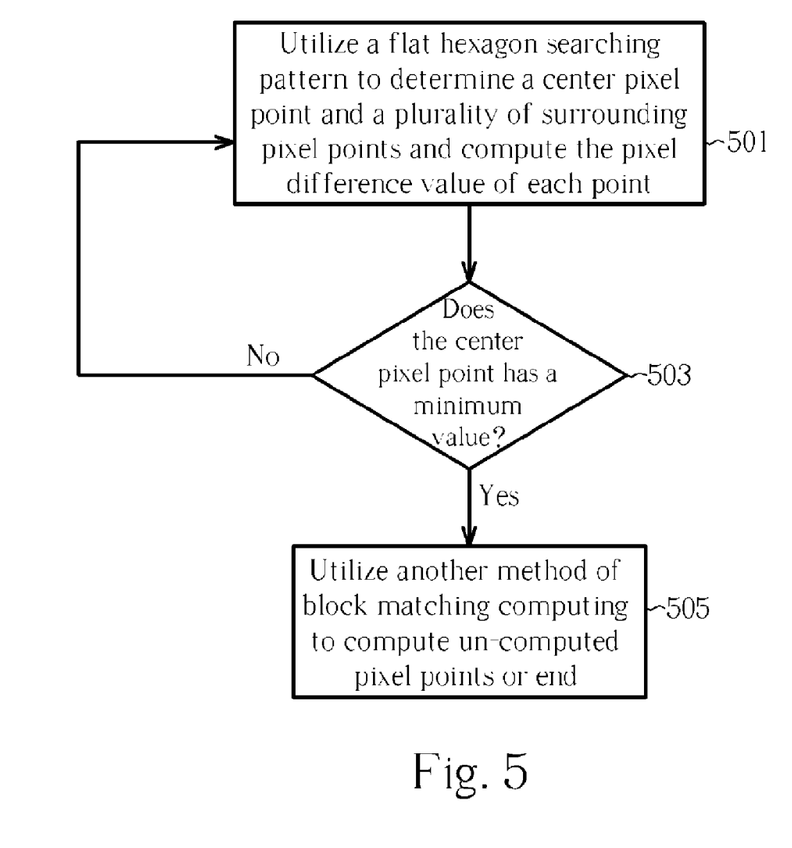
FIG. 5 is a flow chart illustrating the method of flat hexagon pattern block matching computing according to the preferred embodiment of the present invention.

FIG. 5 is a flow chart illustrating the method of flat hexagon pattern block matching computing according to the preferred embodiment of the present invention.

Step 501:

Utilize flat hexagon searching pattern to determine a center pixel point and a plurality of surrounding pixel points and compute the pixel difference value of each point.

Step 503:

Determine if the center pixel point is a minimum value. If yes, enter step 505, otherwise enter step 501.

Step 505:

Utilize another method of block matching computing to compute un-computed pixel points or ends.

Figure 6:
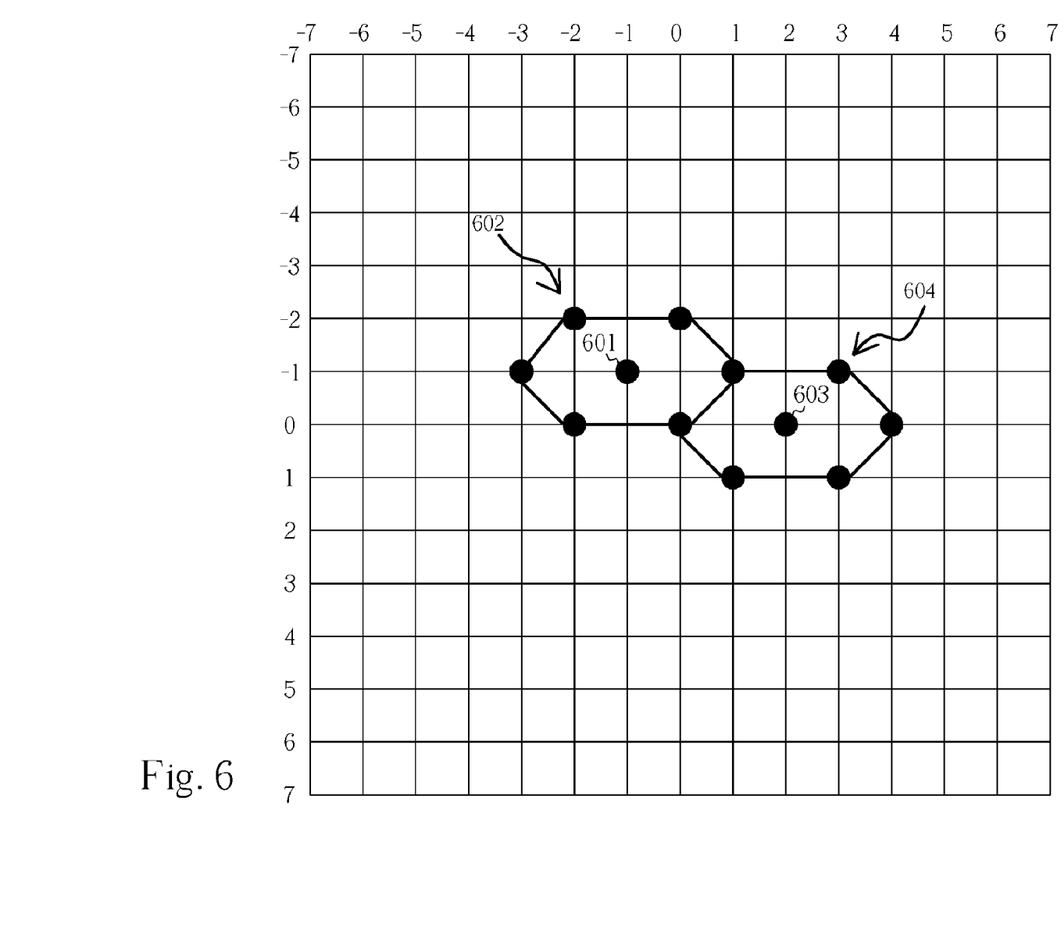
FIG. 6 is a schematic diagram illustrating the method of flat hexagon pattern block matching computing according to the preferred embodiment of the present invention.

The present invention also discloses a multi-path block matching computing method. FIG. 6 is a schematic diagram illustrating the method of flat hexagon pattern block matching computing according to the preferred embodiment of the present invention, which has an initial state as shown in FIG. 1. Please refer to FIG. 1, FIG. 2 and FIG. 6 together in order to understand the present invention more clearly. The difference between FIG. 2 and FIG. 6 is that FIG. 1 utilizes a surrounding pixel point 111 having a minimum pixel difference as the center pixel point 207 in FIG. 2, but in FIG. 6, the center point 601 of the searching pattern 602 and the center pixel points 603 of the searching pattern 604 shown in FIG. 6 are from the pixel point 111 having a minimum pixel difference and the surrounding pixel point 103 having a second pixel value difference, and the searching patterns 602 and 604 are utilized for the next block searching operation. That is, compared with the prior art single directional searching operation, the multi-direction block matching method according to the present invention performs the block searching operation utilizing more than one direction, thus the disadvantage of the prior art can be avoided. In short, the multi-path block matching method according to the present invention computes the pixel value difference between the real pixel value and the minimum pixel value, and utilizes the surrounding pixel points having a pixel value difference less than a predetermined value T as the center pixel point to perform the next block searching operation.

Since the same T value has a different effect depending on the video content, the T value should change according to different video content. Furthermore, T is not fixed while searching is performed in the present invention. If the optimum direction is not determined, the block matching computing will have no effect while the T value is too small. On the other hand, if the optimum direction is determined, the block matching computing is very sensitive and unreliable while the T value is too large. Therefore, the T value should meet the following condition:

$$T = \text{SADmin} \times \beta$$

After recognition, the processed T value can increase the speed and accuracy of the multi-path searching method. The preferred value range of $\beta$ is $0 \leq \beta \leq 2$, but this is not meant to limit the scope of the present invention.

It should be noted that the multi-path block matching calculating method can not only be applied to the flat hexagon block matching calculating method but can also be applied to other prior art block matching calculating methods. Additionally, the number of center points of the next block searching operation is not limited to be two, and can be greater.

Figure 7:
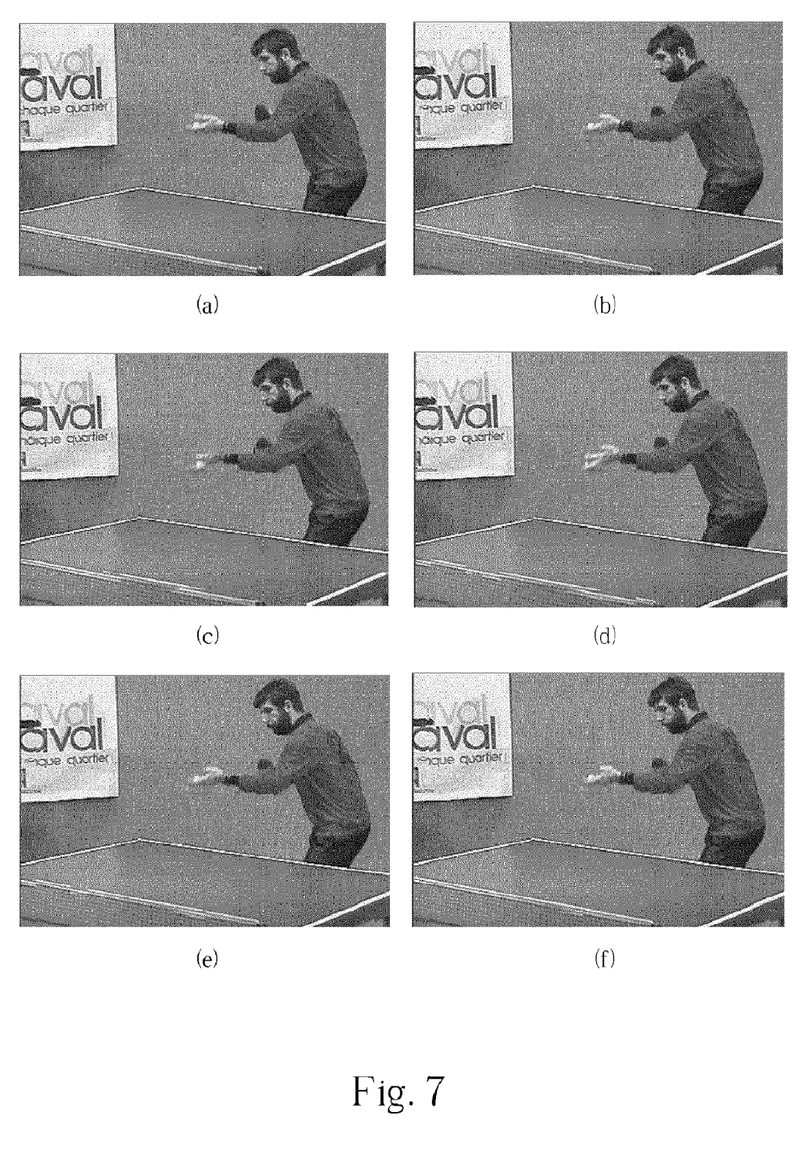
FIG. 7 is a schematic diagram illustrating the comparison between the frames according to the searching method of the present invention and the frames from the prior art.

FIG. 7 is a schematic diagram illustrating the comparison between the frames according to the searching method of the present invention and the frames from the prior art. FIG. (a) is an original frame and FIG. (b) is a frame from the full searching method (FS), wherein the MSE of the frame is 155.7 and the checking points of the frame are 202.048. FIGS. (c)~FIG. (f) are the frames from the flat hexagon according to the present invention. FIG. (c) has β=0, MSE=233.2, checking points=13.415, FIG. (d) has β=0.1, MSE=198.1, checking points=16.61, FIG. (e) has β=0.22, MSE=178.8, checking points=22.34, and FIG. (f) has β=0.36, MSE=163.2, checking points=29.262. It is apparent from the above figures that FIG. (f) is of an equally high quality as FIG. (b), where FIG. (b) utilizes FS, but has a high calculation amount (the checking points are seven times as much as in FIG. (f)). The calculation amount required for other image sequences may even need 10 times as much as FIG. (f), thus the present invention is novel and significantly improves over conventional methods.

Since computer hardware is continually improving and demand for high quality and accuracy simultaneously increases, the new block matching calculating method should focus on quality. The multi-path block matching calculating method is based on high-speed block matching calculating methods and retains the accuracy of the original high-speed block matching calculating method (while β=0). If the multi-path block matching calculating method is used with a β that is greater than a predetermined value, accuracy can be ensured for any video sample. The method is also adjustable and can operate at high-speed. In the environment of non-real time video compression, such kind of block matching calculating method is necessary for video conversion. Moreover, a high image quality is needed for users viewing video programs, and the adjustable speed and quality are necessary. The method according to the present invention can meet all the above-mentioned requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-path method of block matching computing for image processing, comprising:
   (a) determining a searching pattern with a center pixel point and a plurality of surrounding pixel points to perform a block searching operation;
   (b) computing a plurality of pixel value differences between the surrounding points of two continuous frames; and
   (c) utilizing at least two selected pixel points selected from the surrounding pixel points as the center pixel points of at least two searching patterns to perform a next block searching operation utilizing at least two searching paths,
   wherein each of the selected pixel points has a pixel value difference, which is generated in the step (b) and has a difference from a minimum value of the pixel value differences generated in the step (b), where the difference is less than a predetermined value;
   wherein steps of the multi-path method of block matching are performed by a computer.

2. The method of claim 1, wherein the pixel value difference is a part of a sum of absolute differences (SAD).

3. The method of claim 1, wherein the predetermined value is the difference between the minimum pixel value and a real pixel value of a current block searching operation multiplying β, where $0 \leq \beta \leq 2$.

4. The method of claim 1, wherein the method is stopped when the pixel value difference of the center pixel point is a minimum value of the pixel value differences.

5. A method of block matching computing for image processing, comprising:
   (a) determining a searching pattern with a center pixel point and a plurality of surrounding pixel points, wherein the searching pattern includes a larger searching area in a horizontal direction than a searching area in the vertical direction;
   (b) computing a plurality of pixel value differences between the surrounding pixel points of two continuous frames; and
   utilizing at least two selected pixel points selected from the surrounding pixel points as center pixel points of at least two searching patterns to perform a next block searching operation utilizing at least two searching paths, wherein each of the selected pixel points has a pixel value difference, which is generated in the step (b) and has a difference from a minimum value of the pixel value differences generated in the step (b), where the difference is less than a predetermined value;
   wherein steps of a multi-path method of block matching are performed by a computer.

6. The method of claim 5, wherein the searching pattern is a flat hexagon pattern.

7. The method of claim 5, wherein the pixel value difference is a sum of absolute differences (SAD).

8. The method of claim 5, wherein the predetermined value is the difference between the minimum pixel value and a real pixel value of a current block searching operation multiplying β, where $0 \leq \beta \leq 2$.

9. The method of claim 5, further comprising:
   utilizing another method of block matching computing to compute un-computed pixel points in the search pattern while the center pixel points include the minimum pixel value difference.

10. The method of claim 5, wherein the method is stopped when the pixel value difference of the center pixel point is the minimum of the pixel value differences.

11. A multi-path method of block matching computing for image processing, comprising:
    (a) determining a searching pattern with a center pixel point and a plurality of surrounding pixel points to perform a block searching operation;
    (b) computing a plurality of pixel value differences between the surrounding points of two continuous frames; and
    (c) selecting a first pixel point from the surrounding pixel points as a center pixel point of a first searching pattern to perform a next block searching operation;
    (d) selecting a second pixel point from the surrounding pixel points as a center pixel point of a second searching pattern to perform the next block searching operation;
    (e) simultaneously utilizing the first searching pattern and the second searching pattern to perform the next block searching operation;
    wherein each of the first and the second pixel points has a pixel value difference, which is generated in the step (b) and has a difference from a minimum value of the pixel value differences generated in the step (b), where the difference is less than a predetermined value;
    wherein steps of the multi-path method of block matching are performed by a computer.

* * * * *